US012626181B2

(12) United States Patent
Karaletsos et al.

(10) Patent No.: US 12,626,181 B2
(45) Date of Patent: May 12, 2026

(54) MODEL BASED REINFORCEMENT LEARNING BASED ON GENERALIZED HIDDEN PARAMETER MARKOV DECISION PROCESSES

(71) Applicant: Uber Technologies, Inc., San Francisco, CA (US)

(72) Inventors: Theofanis Karaletsos, San Francisco, CA (US); Felipe Petroski Such, San Francisco, CA (US); Christian Francisco Perez, Mountain View, CA (US)

(73) Assignee: Uber Technologies, Inc., San Francisco, CA (US)

( * ) Notice: Subject to any disclaimer, the term of this patent is extended or adjusted under 35 U.S.C. 154(b) by 761 days.

(21) Appl. No.: 16/881,557

(22) Filed: May 22, 2020

(65) Prior Publication Data

US 2020/0372410 A1     Nov. 26, 2020

Related U.S. Application Data

(60) Provisional application No. 62/851,858, filed on May 23, 2019.

(51) Int. Cl.
*G06N 20/00* (2019.01)
*G06N 7/01* (2023.01)

(52) U.S. Cl.
CPC .............. *G06N 20/00* (2019.01); *G06N 7/01* (2023.01)

(58) Field of Classification Search
CPC ........ G06N 20/00; G06N 7/005; G06N 20/20; G06N 3/0454; G06N 3/08; G06N 3/006
See application file for complete search history.

(56) References Cited

PUBLICATIONS

Doshi-Velez, Finale, and George Konidaris. "Hidden parameter markov decision processes: A semiparametric regression approach for discovering latent task parametrizations." IJCAI: proceedings of the conference. vol. 2016. NIH Public Access, 2016. (Year: 2016) https://www.ncbi.nlm.nih.gov/pmc/articles/PMC5466173/pdf/nihms859880.pdf.*
Yao, Jiayu, et al. "Direct policy transfer via hidden parameter markov decision processes." LLARLA Workshop, FAIM. vol. 2018. 2018. https://twkillian.github.io/papers/YaoKillianKonidarisFDV2018_ICML.pdf (Year: 2018).*

(Continued)

*Primary Examiner* — Michael H Hoang
(74) *Attorney, Agent, or Firm* — Fenwick & West LLP

(57) ABSTRACT

A machine learning model for reinforcement learning uses parameterized families of Markov decision processes (MDP) with latent variables. The system uses latent variables to improve ability of models to transfer knowledge and generalize to new tasks. Accordingly, trained machine learning based models are able to work in unseen environments or combinations of conditions/factors that the machine learning model was never trained on. For example, robots or self-driving vehicles based on the machine learning based models are robust to changing goals and are able to adapt to novel reward functions or tasks flexibly while being able to transfer knowledge about environments and agents to new tasks.

19 Claims, 5 Drawing Sheets

(56)  References Cited

PUBLICATIONS

Konidaris, George, and Finale Doshi-Velez. "Hidden parameter Markov decision processes: an emerging paradigm for modeling families of related tasks." 2014 AAAI Fall Symposium Series. 2014. https://www.aaai.org/ocs/index.php/FSS/FSS14/paper/view/9203/9105 (Year: 2014).*

Vidhate, Deepak A., and Parag Kulkarni. "Expertise based cooperative reinforcement learning methods (ECRLM) for dynamic decision making in retail shop application." International Conference on Information and Communication Technology for Intelligent Systems. Springer, Cham, 2017. (Year: 2017) https://link.springer.com/content/pdf/10.1007/978-3-319-63645-0_39.pdf.*

Killian, Taylor W., et al. "Robust and efficient transfer learning with hidden parameter markov decision processes." Advances in neural information processing systems 30 (2017). https://arxiv.org/pdf/1706.06544.pdf (Year: 2017).*

Nagabandi, Anusha, et al. "Learning to adapt in dynamic, real-world environments through meta-reinforcement learning." arXiv preprint arXiv: 1803.11347 (2018). https://arxiv.org/pdf/1803.11347.pdf (Year: 2018).*

Finn, Chelsea, Pieter Abbeel, and Sergey Levine. "Model-agnostic meta-learning for fast adaptation of deep networks." International conference on machine learning. PMLR, 2017. http://proceedings.mlr.press/v70/finn17a/finn17a.pdf (Year: 2017).*

Bojarski, Mariusz, et al. "End to end learning for self-driving cars." arXiv preprint arXiv:1604.07316 (2016). https://arxiv.org/pdf/1604.07316.pdf (Year: 2016).*

Lopes, Manuel, Francisco Melo, and Luis Montesano. "Active learning for reward estimation in inverse reinforcement learning." Joint European Conference on Machine Learning and Knowledge Discovery in Databases. Springer, Berlin, Heidelberg, 2009. (Year: 2009) https://link.springer.com/content/pdf/10.1007/978-3-642-04174-7_3.pdf?pdf=inline%20link.*

Zhang, Jingwei, et al. "Deep reinforcement learning with successor features for navigation across similar environments." 2017 IEEE /RSJ International Conference on Intelligent Robots and Systems (IROS). IEEE, 2017. https://ieeexplore.ieee.org/stamp/stamp.jsp?tp=&arnumber=8206049 (Year: 2017).*

Konidaris, George, and Finale Doshi-Velez. "Hidden parameter Markov decision processes: an emerging paradigm for modeling families of related tasks." 2014 AAAI Fall Symposium Series. 2014. https://cdn.aaai.org/ocs/9203/9203-40017-1-PB.pdf (Year: 2014).*

Packer, Charles, et al. "Assessing generalization in deep reinforcement learning." arXiv preprint arXiv:1810.12282 (2018). https://arxiv.org/pdf/1810.12282.pdf (Year: 2018).*

Doshi-Velez, Finale, et al. "Bayesian nonparametric methods for partially-observable reinforcement learning." IEEE transactions on pattern analysis and machine intelligence 37.2 (2013): 394-407. https://ieeexplore.ieee.org/stamp/stamp.jsp?tp=&arnumber=6616533 (Year: 2013).*

* cited by examiner

Accessing machine learning based
model based on generalized hidden
parameter MDP
400

Training the machine learning based
model based on sets of latent
variables
410

Executing the machine learning
based model in new environment
420

MODEL BASED REINFORCEMENT LEARNING BASED ON GENERALIZED HIDDEN PARAMETER MARKOV DECISION PROCESSES

CROSS REFERENCE TO RELATED APPLICATIONS

This application claims the benefit of U.S. Provisional Application No. 62/851,858, filed May 23, 2019, which is incorporated by reference in its entirety.

BACKGROUND

1. Technical Field

The subject matter described generally relates to artificial intelligence and machine learning, and in particular to deep reinforcement learning techniques based on Markov decision processes.

2. Background Information

Artificial intelligence is used for performing complex tasks, for example, natural language processing, computer vision, speech recognition, bioinformatics, recognizing patterns in images, and so on. Artificial intelligence techniques used for these tasks include machine learning based models, for example, neural networks. One such application of artificial intelligence is in reinforcement learning based systems, for example, systems that monitor their environment and take appropriate actions to achieve a task. Examples of such systems include a robot monitoring its surroundings using a camera and navigating through an obstacle course or an autonomous vehicle monitoring the road traffic using various sensors including cameras and LIDAR (light detection and ranging) sensors and driving through traffic on a road. Such systems need to be able to operate in various environment and under varying conditions. For example, a robot should be able to work under varying environments such as clear conditions, rainy conditions, icy conditions, and so on. Furthermore, internal factors related to the robot may affect its operation, for example, rust in joints, certain faults in components, improper servicing of components and so on. A robot using a model trained under one set of conditions may not be able to operate in different set of conditions. Conventional techniques require such models to be trained under all possible conditions in which they operate. This requires a huge amount of training data that may be very difficult to obtain. As a result, these techniques are inefficient in terms of training of the models.

SUMMARY

Embodiments use parametrized families of generalized hidden parameter Markov decision process (GHP-MDPs) based models with structured latent spaces. Use of latent spaces provides improved ability to transfer knowledge, generalize to new tasks and handle combinatorial problems. Accordingly, trained models are able to work in unseen environments or combinations of conditions/factors that the model was never trained on.

Embodiments are used in various applications of reinforcement learning based models, for example, models used by robots or self-driving vehicles. Embodiments allow robots to be robust to changing goals and allow them to adapt to novel reward functions or tasks flexibly while being able to transfer knowledge about environments and agents to new tasks. Other embodiments can use the disclosed techniques for other applications for example, self-driving vehicles.

According to an embodiment, a system accesses a machine learning model for reinforcement learning. The machine learning model is based on Markov decision processes (MDP) represented using a state space, an action space, a transition function, and a reward function. The transition function and the reward function are parameterized by sets of latent variables. The machine learning model is configured for execution by an agent in an environment. Each hidden parameter corresponds to one or more of: (a) a factor representing an environment in which the machine learning model is executed, or (b) an attribute of an agent executing the machine learning based model.

The machine learning model is trained based on variations of the set of latent variables corresponding to the transition function and the reward function. The trained machine learning model is executed in a new environment. The execution of the machine learning model is based on a combination of latent variables from the sets of latent variables corresponding to the transition function and the reward function that is distinct from combinations of latent variables used during training of the machine learning based model.

Figure 1:
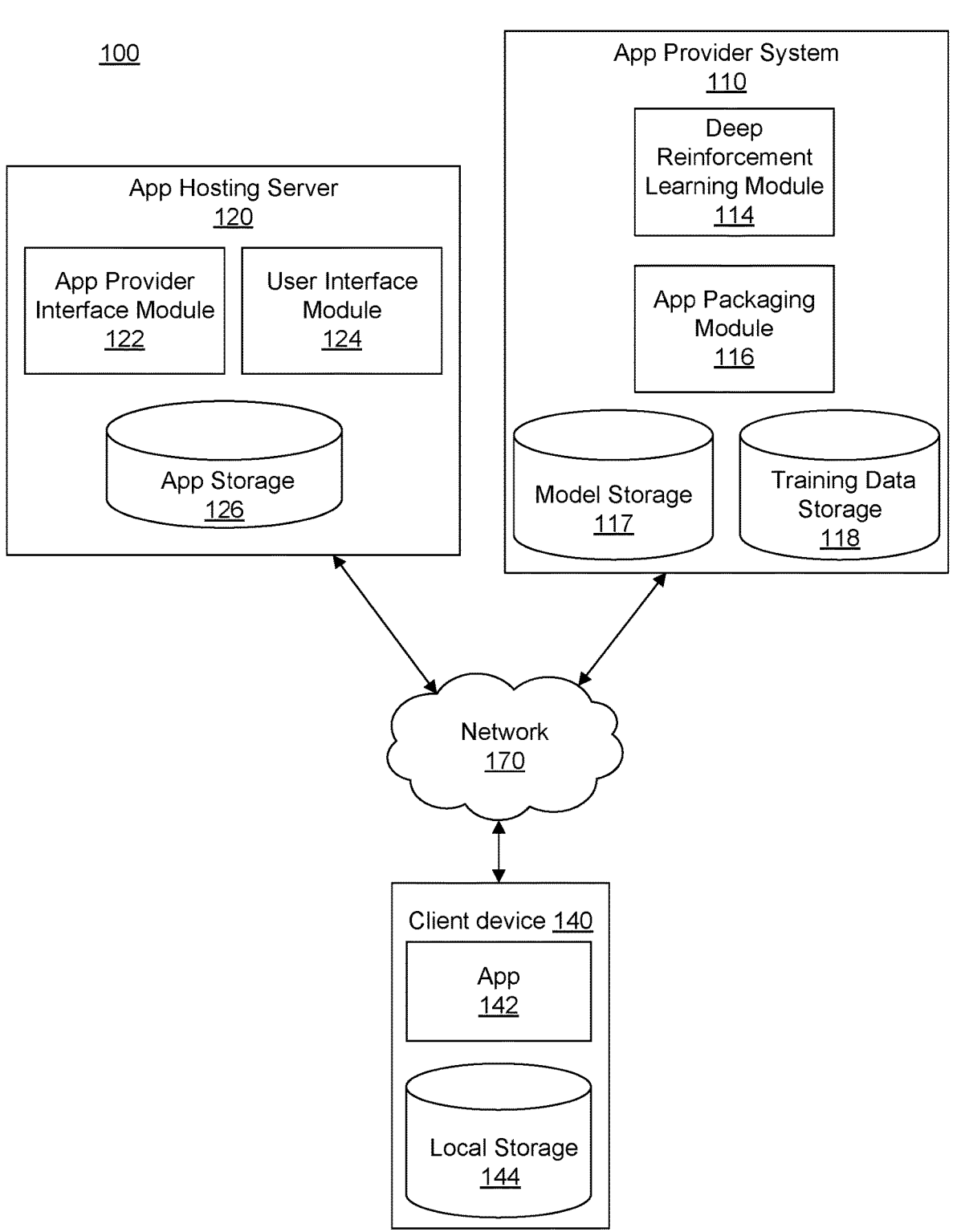
FIG. 1 illustrates a networked computing environment 100 in which deep reinforcement learning may be used, according to an embodiment.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

DETAILED DESCRIPTION

Embodiments create reinforcement learning (RL) based models used by agents that can solve many (related) tasks and adapt to new tasks and environments after initial training. Systems use model-based RL that leverages learned surrogate models that describe dynamics and rewards of individual tasks, such that planning in a good surrogate leads to good control of the true system.

Embodiments use generalized hidden parameter MDPs (GHP-MDPs) that describe a family of MDPs where both dynamics and reward can change as a function of hidden parameters that vary across tasks. The GHP-MDP augments model-based RL with latent variables that capture these hidden parameters, facilitating transfer across tasks. Some embodiments use a variant of the model that incorporates explicit latent structure mirroring the causal factors of variation across tasks, for instance, agent properties, environmental factors, and goals.

Embodiments may use one of two variants of latent variable models: one with a shared latent variable to capture all variations in reward and dynamics, and a structured model where latent variables factorize causally. The GHP-MDPs uses prior knowledge and inductive biases that improve sample efficiency, transfer, and generalization. Agents are trained on a small subset of possible tasks, all related as instances from the same GHPMDP, and then generalized to novel tasks from the same family via inference.

Accordingly, embodiments generate models that can learn quickly across tasks encountered during training and generalize to other tasks encountered at execution time. Consider an agent with some pattern of broken actuators (example of agent variation) acting in an environment with changing surface conditions due to weather (example of dynamics variation), tasked with achieving one of many possible goals (example of reward variation). The learning techniques according to various embodiments (1) pool information across observed tasks to learn faster (positive transfer), and generalize from observed combinations of agent, dynamics, and reward variations to (2) other unseen combinations (referred to as weak generalization) and (3) novel variations (referred to as strong generalization) without learning a new policy entirely from scratch.

Embodiments use one or more latent variables that capture the factors of variation implicitly represented by tasks at training time. At execution time, the system infers the MDP by inferring the latent variables that form a latent embedding space of the hidden parameters. Accordingly, the system augments transferable models of MDPs with structure on reward and dynamics, and combines it with powerful approaches for learning probabilistic models to solve challenging RL tasks.

A hidden parameter may represent an attribute of the agent, for example, a condition of robot indicating whether a part of the robot is rusted, whether a part of the robot (e.g., a leg) is not functioning, whether a camera is malfunctioning, and so on. A hidden parameter may represent conditions of environment, for example, icy condition, windy conditions, rainy condition, and so on. The system uses latent variables to represent hidden parameters. A latent variable is aimed at learning a representation of one or more hidden parameters which can be provided to a surrogate dynamics model. A hidden parameter can also denote changes in reward function, i.e. a different goal. For example, a different reward function is used for a robot trained to carry a package from one location to another vs. playing a game.

The system maximizes an expected reward over some task-dependent time horizon with an optimal policy. The agent is trained to learn the transition function T as well as reward function R. If an agent is trained for a particular parameter representing the agent condition, the training applies to all environments in which the agent can execute the model. If an agent is trained for a particular environment, the training applies to all agent conditions.

According to some embodiments, both the transition function T and reward function R is parameterized and can change based on latent variables representing hidden parameters. Some embodiments allow both reward and transition function to change based on the same set of latent variables. In some embodiments, the transition function T and reward function R change based on separate set of latent variables that may or may not overlap.

The model which is trained using certain parameter values can be executed for values of parameters and combinations of parameter values that were not used during training. For example, if a robot based on the system learns to operate under icy conditions, the robot is able to operate under icy conditions for all other combinations of parameters, for example, parameters representing various robot conditions such as faulty arms/legs, rusted parts, and so on. The system trains the model using less training data than conventional systems require.

The latent variables are inferred on the fly and may not be stored. The system may store the latent variables but the system can also infer them any time. By updating knowledge in dedicated latent variables, the neural network is trained in such a way that it learns disentangled dynamics and rewards. The model learns to expect factorized explanations of the data. This allows the model to later search over such hypotheses efficiently. However, the model does not need to have trained on all possible factors, it can also generalize to previously entirely unseen factors and works well if factors have similarity to other factors it has seen in the past.

In any given new environment, an agent, for example, an agent of a robot acts under uncertainty about the hidden parameters and given the outcome of actions with random hidden parameters, updates its beliefs about those hidden parameters. The system repeats the following steps in a loop. The system works based on the assumption that the agent has no idea what hidden parameters are initially. Then, the agent acts to the best of its knowledge and observes outcome of its actions which may mismatch with its expectations. The agent then adjusts the hidden parameters to find settings that would have made the outcomes of its previous actions consistent with its beliefs for given hidden parameters. As such, the model plans and acts based on its current belief in hidden parameters, observes outcomes, infers and updates beliefs about hidden parameters in order to align observations with its simulation of what would happen given hidden parameter settings, and acts again based on planning. The outcome of this loop is that the agent can very rapidly update the correct latent variable/hidden parameter to learn a model of a system and can transfer knowledge from previously learned factors rapidly because it can search combinatorially between the different hidden parameters.

Embodiments improve on the state-of-the-art sample efficiency for complex tasks while matching performance of model-free meta-RL approaches. The system also succeeds with a fairly small number of training tasks. As a result, the embodiments improve on computational efficiency of training of machine learning models and also generate machine learning models that are and improvement over conventional models since they can perform better under environments and conditions that were not encountered during training.

Overall System Environment

FIG. 1 illustrates a networked computing environment 100 in which deep reinforcement learning may be used, according to an embodiment. In the embodiment shown in FIG. 1, the networked computing environment 100 includes an application provider system 110, an application provider server 120, and a client device 140, all connected via a network 170. An application is also referred to herein as an app. Although only one client device 140 is shown, in practice many (e.g., thousands or even millions of) client devices may be connected to the network 170 at any given time. In other embodiments, the networked computing environment 100 contains different and/or additional elements. In addition, the functions may be distributed among the elements in a different manner than described. For example, the client device 140 may obtain the application 142 directly from the application provider system 110, rather than from the application hosting server 120.

The application provider system 110 is one or more computer systems with which the provider of software develops that software. Although the application provider system 110 is shown as a single entity, connected to the network 170, for convenience, in many cases it will be made up from several software developer's systems (e.g., terminals) which may or may not all be network-connected.

In the embodiment shown in FIG. 1, the application provider system 110 includes a deep reinforcement learning module 114, an application packaging module 116, a model storage 117, and training data storage 118. In other embodiments, the application provider system 110 contains different and/or additional elements. In addition, the functions may be distributed among the elements in a different manner than described.

The deep reinforcement learning module 114 trains models using processes and techniques disclosed herein. The deep reinforcement learning module 114 stores the trained models in the model storage 117. The app packaging module 116 takes a trained mode and packages it into an app to be provided to client devices 140. Once packaged, the app is made available to client devices 140 (e.g., via the app hosting server 120).

The model storage 117 and training data storage 118 include one or more computer-readable storage-media that are configured to store models, for example, neural networks and training data, respectively. Although they are shown as separate entities in FIG. 1, this functionality may be provided by a single computer-readable storage-medium (e.g., a hard drive).

The app hosting server 120 is one or more computers configured to store apps and make them available to client devices 140. In the embodiment shown in FIG. 1, the app hosting server 120 includes an app provider interface module 122, a user interface module 124, and app storage 126. In other embodiments, the app hosting server 120 contains different and/or additional elements. In addition, the functions may be distributed among the elements in a different manner than described.

The app provider interface module 114 adds the app (along with metadata with some or all of the information provided about the app) to app storage 126. In some cases, the app provider information module 114 also performs validation actions, such as checking that the app does not exceed a maximum allowable size, scanning the app for malicious code, verifying the identity of the provider, and the like.

The user interface module 124 provides an interface to client devices 140 with which apps can be obtained. In one embodiment, the user interface module 124 provides a user interface using which the users can search for apps meeting various criteria from a client device 140. Once users find an app they want (e.g., one provided by the app provider system 110), they can download them to their client device 140 via the network 170.

The app storage 126 include one or more computer-readable storage-media that are configured to store apps and associated metadata. Although it is shown as a single entity in FIG. 1, the app storage 126 may be made up from several storage devices distributed across multiple locations. For example, in one embodiment, app storage 126 is provided by a distributed database and file storage system, with download sites located such that most users will be located near (in network terms) at least one copy of popular apps.

The client devices 140 are computing devices suitable for running apps obtained from the app hosting server 120 (or directly from the app provider system 110). The client devices 140 can be desktop computers, laptop computers, smartphones, PDAs, tablets, or any other such device. In an embodiment, a client device represents a computing system that is part of a larger apparatus, for example, a robot, a self-driving vehicle, a drone, and the like. In the embodiment shown in FIG. 1, the client device 140 includes an application 142 and local storage 144. The application 142 is one that uses a trained model to perform a task, such as one created by the application provider system 110. The local data store 144 is one or more computer readable storage-media and may be relatively small (in terms of the amount of data that can be stored). Thus, the use of a compressed neural network may be desirable, or even required.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, 3G, 4G, etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
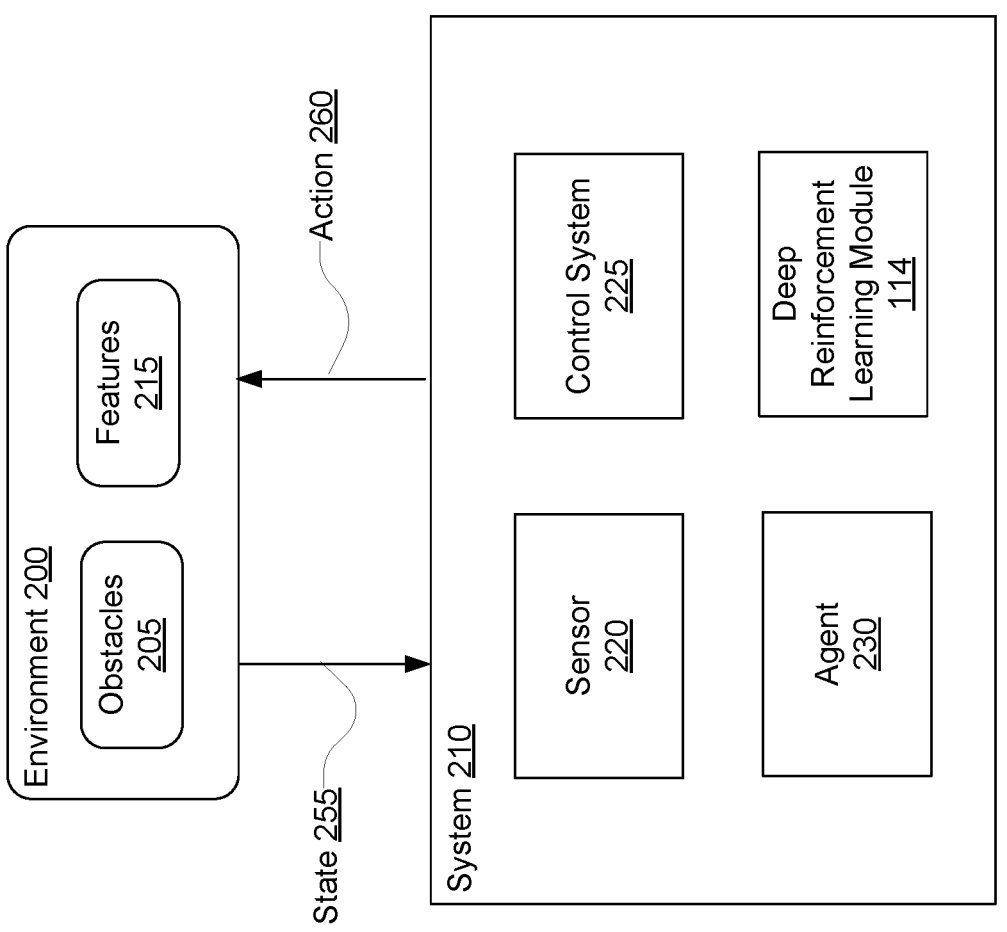
FIG. 2 illustrates a system for training and using deep reinforcement learning based models, according to one embodiment.

FIG. 2 illustrates a system for training and using deep reinforcement learning based models, according to one embodiment. Reinforcement learning (RL) based machine learning models are used by agents that learns from interacting with an environment and receives a reward by acting in the environment. The agent learns by selecting actions that maximize the reward over time. For certain tasks, the agent receives a reward responsive to successfully completing the task. However, the agent may have to perform a sequence of actions to complete the task. The agent does not receive a reward for every action of the sequence that it performs.

The system 210 shown in FIG. 2 is a computing system that may be part of an apparatus or device, for example, a self-driving car or a robot. The environment 200 represents the surroundings of the system. For example, the environment 200 may represent a geographical region through which a self-driving car is travelling. Alternatively, the environment 200 may represent a maze or an obstacle course through which a robot is walking. As another example, the environment 200 may represent a setup of a game that the system 210 is playing, for example, an ATARI game.

The environment 210 may comprise objects that may act as obstacles 205 or features 215 that are detected by the system 210. The system 210 comprises one or more sensors 220, a control system 225, an agent 230, and a deep reinforcement learning module 114. The system 210 uses the sensor 220 to sense the state 255 of the environment 200. The agent 230 performs actions 260. The actions 260 may cause the state of the environment to change.

The sensor 220 may be a camera that captures images of the environment. Other examples of sensors include a lidar, an infrared sensor, a motion sensor, a pressure sensor, or any other type of sensor that can provide information describing the environment 210 to the system 210. The agent 230 uses models trained by the deep reinforcement learning module 114 to determine what action to take. The agent 230 sends signals to the control system 225 for taking the action 260. Examples of sensors include a lidar, a camera, a global positioning system (GPS), and an inertial measurement unit (IMU).

For example, the sensors of a robot may identify an object. The agent of the robot invokes a model to determine a particular action to take, for example, to move the object. The agent 230 of the robot sends signals to the control system 225 to move the arms of the robot to pick up the object and place it elsewhere. Similarly, a robot may use sensors to detect the obstacles surrounding the robot to be able to maneuver around the obstacles.

As another example, a self-driving car may capture images of the surroundings to determine a location of the self-driving car. As the self-driving car drives through the region, the location of the car changes and so do the surroundings of the car change. As another example, a system playing a game, for example, an ATARI game may use sensors to capture an image representing the current configuration of the game and make some move that causes the configuration of the game to change.

As another example, the system may be part of a drone. The system navigates the drone to deliver an object, for example, a package to a location. The model helps the agent to determine what action to take, for example, for navigating to the right location, avoiding any obstacles that the drone may encounter, and dropping the package at the target location.

As another example, the system may be part of facility, for example, a chemical plant, a manufacturing facility, or a supply chain system. The sensors monitor equipment used by the facility, for example, monitor the chemical reaction, status of manufacturing, or state of entities/products/services in the supply chain process. The agent takes actions, for example, to control the chemical reaction, increase/decrease supply, and so on.

An action represents a move that the agent can make. An agent selects from a set of possible actions. For example, if the system is configured to play video games, the set of actions includes running right or left, jumping high or low, and so on. If the system is configured to trade stocks, the set of actions includes buying, selling or holding any one of an array of securities and their derivatives. If the system is part of a drone, the set of actions includes increasing speed, decreasing speed, changing direction, and so on. If the system is part of a robot, the set of actions includes walking forward, turning left or right, climbing, and so on. If the system is part of a self-driving vehicle, the set of actions includes driving the vehicle, stopping the vehicle, accelerating the vehicle, turning left/right, changing gears of the vehicle, changing lanes, and so on.

A state represents a potential situation in which an agent can find itself; i.e. a configuration in which the agent (or the system/apparatus executing the agent, for example, the robot, the self-driving car, the drone, etc.) is in relation to its environment or objects in the environment. In an embodiment, the representation of the state describes the environment as observed by the agent. For example, the representation of the state may include an encoding of sensor data received by the agent, i.e., the state represents what the agent observes in the environment.

In some embodiments, the representation of the state encodes information describing an apparatus controlled by the agent, for example, (1) a location of the apparatus controlled by the agent, e.g., (a) a physical location such as a position of a robot in an obstacle course or a location of a self-driving vehicle on a map, or (b) a virtual location such as a room in a computer game in which a character controlled by the agent is present; (2) an orientation of the apparatus controlled by the agent, e.g., the angle of a robotic arm; (3) the motion of the apparatus controlled by the agent, e.g., the current speed/acceleration of a self-driving vehicle, and so on.

The representation of the state depends on the information that is available in the environment to the agent. For example, for a robot, the information available to an agent controlling the robot may be the camera images captured by a camera mounted on the robot. For a self-driving vehicle, the state representation may include various type of sensor data captured by sensors of the self-driving vehicles including camera images captured by cameras mounted on the self-driving vehicle, lidar scans captured by lidars mounted on the self-driving vehicle, and so on. If the agent is being trained using a simulator, the state representation may include information that can be extracted from the simulator that may not be available in real-world, for example, the position of the robot even if the position may not be available to a robot in real world. The availability of additional information that may not be available in real world is utilized by the explore phase to efficiently find solutions to the task.

Objects in the environment may be physical objects such as obstacles for a robot, other vehicles driving along with a self-driving vehicle. Alternatively, the objects in the environment may be virtual objects, for example, a character in a video game or a stock that can be bought/sold. The object may be represented in a computing system using a data structure.

A reward is the feedback by which the system measures the success or failure of an agent's actions. From a given state, an agent performs actions that may impact the environment, and the environment returns the agent's new state (which resulted from acting on the previous state) as well as rewards, if there are any. Rewards evaluate the agent's action.

A policy represents the strategy that the agent employs to determine the next action based on the current state. A policy maps states to actions, for example, the actions that promise the highest reward. A trajectory represents a sequence of states and actions that influence those states.

In an embodiment, an agent uses a neural network to select the action to be taken. For example, the agent may use a convolutional neural network to process the sensor data, for example, an image of the surroundings representing the environment. The convolutional neural network is configured to select the action to be performed in a given situation.

The convolutional neural network may rank various actions by assigning a score to each action and the agent selects the highest scoring action.

Deep Reinforcement Learning Based on Hidden Parameter MDPs

Embodiments of the system train and execute reinforcement learning (RL) based models using MDPs. An MDP is represented using $\{S, \mathcal{A}, \mathcal{T}, \mathcal{R}, \rho_0\}$ a state space S, action space $\mathcal{A}$, transition function $\mathcal{T}$, reward function $\mathcal{R}$, and initial state distribution $r_0$. A task (or environment) $\tau$ is defined as an MDP from a set of MDPs that share S and $\mathcal{A}$ but differ in one or more of $\{\mathcal{T}, \mathcal{R}, \rho_0\}$.

As an example, for a robot the state space may represent the ways in which the body of the robot is configured and the environment of the robot that may be captured by the sensors of the robot. The action space $\mathcal{A}$ represents the actions that a robot can take with its actuators based on signals generated by its controls. A transition function maps a state and an action performed in that state to a new state. In model-based RL, the agent uses a model of the transition dynamics $\mathcal{T}, :S\times \mathcal{A} \to S$ in order to maximize rewards over some task-dependent time horizon H. The reward is associated with an action performed in a given state.

The reward for a robot may be fulfilling a task or getting close to a target position. The reward function for the same robot may be different depending on the task that the robot is performing. Each reward corresponds to an MDP. For example, for the same robot, there may be multiple MDPs corresponding to each different type of task that the robot can perform. The transition function $\mathcal{T}$, is parameterized by a hidden parameter. For example, for a self-driving vehicle, the hidden parameter may represent an environmental factor, for example, a measure of an amount of traffic through which the self-driving vehicle drives, a measure of road conditions, such as how slippery the roads are, and so on. The hidden parameters allow the model to adapt from one environment to another. For example, a model trained for one type of road conditions can adapt to another type of road conditions or a model trained for one type of traffic conditions can adapt to another type of traffic conditions. This allows a model trained for one type of city conditions to be used in another type of city conditions for a self-driving vehicle. As another example, a hidden parameter represents a condition of a robot and a model that is used by a robot functions in view of certain faults in the robot, for example, when the robot is partially functional as a result of certain parts of the robot failing. Or the hidden parameter may represent environment change, for example, the robot is working in rain or icy conditions which represents a different environment from where the robot was trained (for example, dry and sunny conditions). For a (potentially state-conditional) action distribution $\pi$parameterized by $\theta$, the system maximizes the expected reward with an optimal policy $\pi^*$ as described by following equation.

$$\pi^*(a \mid s) = \mathrm{argmax}_\theta \mathbb{E}_{a_{t'} \sim \pi_\theta(a|s)} \sum_{t'=0}^{H-1} r(s_{t'}, a_{t'}) \tag{1}$$

In equation (1) $\mathcal{T}$, acts as a probability distribution over next states in a stochastic environment. The expression $\pi^*(a|s)$ represents the policy $\pi^*$ that determines the action a to be taken in a state s; state $s_{t'+1} \sim T(s_{t'}, a_{t'})$; and $r(s_{t'}, a_{t'})$ represents the reward associated with action $a_{t'}$ taken in state $s_{t'}$.

Some embodiments assume a known reward function R and even transition function $\mathcal{T}$, Other embodiments simultaneously learn an approximate model of both the dynamics and reward represented as $\mathcal{T}, \approx \hat{\mathcal{T}} = p_\theta(s_{t+1}|s_t, a_t)$ and $\mathcal{R} \approx \hat{\mathcal{R}} = p_\omega(r_{t+1}|s_t, a_t, s_{t+1})$ with parameters $\theta$ and $\omega$ using data collected from the environment $\mathcal{D}\{(s_t^{(n)}, a_t^{(n)}, s_{t+1}^{(n)}, r_{t+1}^{(n)})\}_{n=1}^N$. Embodiments use model predictive control to perform planning trajectories sampled from the learned models instead of learning a parameteric policy $\pi_\theta$.

The system decomposes the RL problem into two parts: learning models from (limited) observations, and (approximate) optimal control given those models. By iterating between model learning and control, the agent uses the improved model to improve control and vice versa.

In order to perform model-based control, an agent uses knowledge of the dynamics $p(s_{t+1}|s_t, a_t)$ and reward $p(r_{t+1}|s_t, a_t, s_{t+1})$. When these underlying mechanisms are unknown, the system resorts to learning parameterized models $p_\theta(s_{t+1}|s_t, a_t)$ and reward $p_\omega(r_{t+1}|s_t, a_t, s_{t+1})$. For stochastic environments, the system uses a generative model of dynamics and reward. Because these are continuous quantities, the system models each with a Gaussian likelihood. The dynamics, for example, is parameterized by mean $\mu_\theta$ and diagonal covariance $\Sigma_\theta$ produced by a neural network with parameters $\theta$ (and similarly for the reward model using parameters $\omega$).

$$p_\theta(s_{t+1}|s_t, a_t) = \mathcal{N}(\mu_\theta(s_t, a_t), \Sigma_\theta(s_t, a_t))$$

$$p_f(r_{t+1}|s_t, a_t, s_{t+1}) = \mathcal{N}(\mu_\omega(s_t, a_t, s_{t+1}),$$

$$\Sigma_\omega(s_t, a_t, s_{t+1})) \tag{2}$$

From these building blocks, the system constructs a joint probability distribution over trajectories and jointly optimizes model parameters $\{\theta, \omega\}$ given data $\mathcal{D}$.

Some embodiments approximate the predictive distribution of the network by capturing uncertainty through frequentist ensembles of models, in which each ensemble member is trained on a shuffle of the training data. For an ensemble with M members and the collection of all network parameters $\Theta = \{\theta_1, \theta_2, \ldots, \theta_M\}$, the system defines a model of the next state predictive distribution as a mixture model as follows.

$$p(s_{t+1} \mid s_t, a_t; \Theta) = \frac{1}{M}\sum_{\theta \in \Theta} p_\theta(s_{t+1} \mid s_t, a_t) \tag{3}$$

$$\approx p(s_{t+1} \mid s_t, a_t)$$

The reward model is defined as follows.

$$p(r_{t+1} \mid s_t, a_t, s_{t+1}; \Omega) = \frac{1}{M}\sum_{\omega \in \Omega} p_\omega(r_{t+1} \mid s_t, a_t, s_{t+1}) \tag{4}$$

$$\approx p(r_{t+1} \mid s_t, a_t, s_{t+1})$$

The reward model is dependent on $s_{t+1}$, whose values are observed from training data, but at execution-time are the result of predictions from the dynamics model of (3).

Generalized Hidden Parameter MDPs

The system learns a model that can be controlled and then uses that model in order to achieve high reward on the actual system. For sufficiently complex systems and finite training data, the model can only approximate the real system.

Furthermore, the real system may differ in significant ways from the system the models were trained on, as when a robot actuator force degrades over time, unless the conditions were deliberately included in training. However, it is unreasonable to train a model across all possible conditions an agent may encounter. Instead, the system uses a model that learns to account for the causal factors of variation observed across tasks at training time, and then infer at test time the model that best describe the system. The system explicitly incorporates these factors to facilitate generalization to novel variations at execution time.

Embodiments of the system use POMDPs that can be described as a family of MDPs (partially ordered Markov decision processes) where environment dynamics T and reward R are parameterized by hidden parameters $\eta \in \mathbb{R}^n$.

In MDPs, the transition dynamics may be parameterized by hidden parameters $\eta$. In dynamical systems, for example, parameters can be physical quantities like gravity, friction of a surface, or the strength of a robot actuator. These parameters have effect on the dynamical system (e.g., the robot) but are not directly observed. Accordingly, a hidden parameter $\eta$ is not part of the observation space.

These parametrized dynamics and reward functions as $T_\eta$ and $R_\eta$. In some embodiments, $\eta$ represents a set of hidden parameters $\eta = \{\eta_1, \eta_2, \ldots, \eta_k\}$ and subsets of this joint set can be the conditioning set for dynamics and reward, $T_{\eta 1, \eta 2}$ and $R_{\eta 1, \eta 2}$. Note that $T_\eta$ and $R_\eta$ do not each have to use all the dimensions in $\eta$ and could form disjoint subsets $\eta = \{\eta_1, \eta_2\}$ for and Consider a multi-task setting, in which an agent learns across tasks $\tau_i$ where only the reward function $\mathcal{R}_i$ varies, for example, performing tasks that require navigation to a goal position, or movement in a certain direction or target velocity. These tasks come from a parameterized MDP in which the reward function $\mathcal{R}_\eta$ depends on hidden parameters $\eta$ that determine the goal/reward structure.

The system allows both dynamics and reward functions to depend on hidden parameters, as well as allow the hidden parameter set to contain sub-spaces that can be private, shared or partially shared among them. A set of tasks/MDPs with transition dynamics $\mathcal{T}_{,\eta}$ and rewards $\mathcal{R}_\eta$ that are fully described by hidden parameters $\eta$. These MDPs are denoted as generalized hidden parameter MDPs (GHP-MDP). A GHP-MDP includes settings in which tasks can exhibit multiple factors of variation. For example, the models can be used for a robot having a robotic arm with both an unknown goal position g and delivery payload m. This problem is modeled as drawing tasks from a distribution $\eta_g$ and $\eta_m$ with effects on both the transition $\mathcal{T}_{,\eta}$ and rewards $\mathcal{R}_\eta$. Additional factors of variation may be modeled with additional parameters, for example, by changing the size of the payload $\eta_1$. The hidden parameters $\eta$ are generalized to describe more than just physical constants. All of these hidden parameters are treated as latent variables $\{z_i \in \mathbb{R}^{d_i}: i=1 \ldots, c\}$, and the GHP-MDP is represented as a latent variable model.

The system jointly learns the two surrogate models and latent embeddings $z_i$ via the maximization of a variational lower bound over data collected from a small set of training tasks. At execution-time, only the parameters $\varphi$ for the approximate posterior $p_\varphi(z_i | \mathcal{D})$ of the latent variables are learned via inference. The latent variables $z_i$ are an embedding of the true parameters $\eta$, and in general, are not equal to $\eta$, and may have different dimensions (i.e., $d_i$ is not equal to n).

Figure 3:
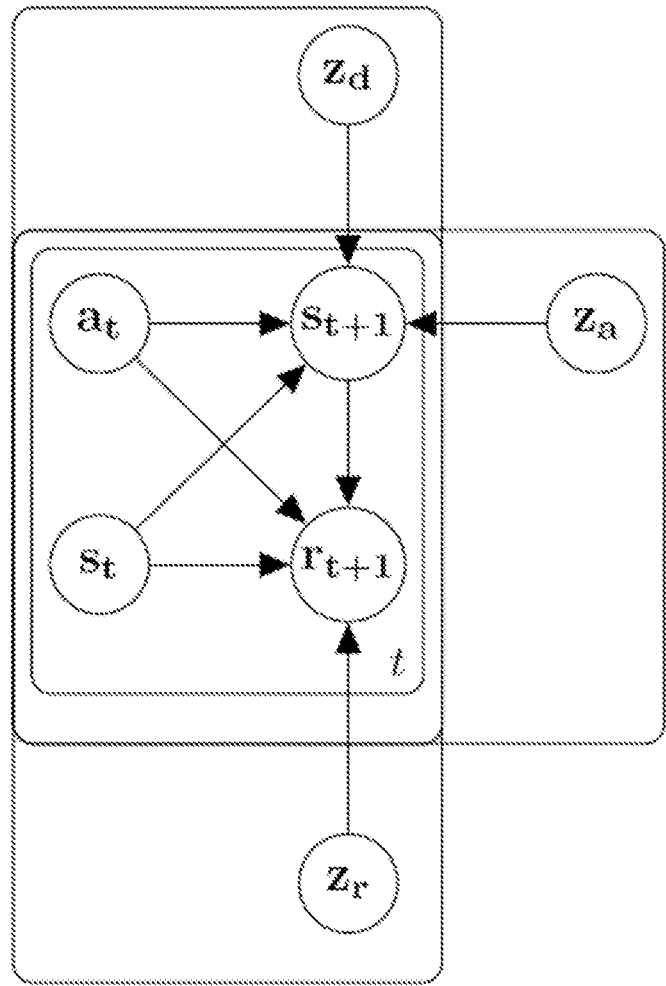
FIG. 3 illustrates a model based on a Markov decision process with structured latent variables for dynamics, agent variation and reward functions, according to one embodiment.

An embodiment uses a probabilistic model of a GHP-MDP that uses a single continuous latent variable z to model hidden parameters of both the dynamics and reward. Because a single latent variable z jointly models all unobserved parameters, this model is referred to as a joint latent variable (joint LV) model. Other embodiments use a model with multiple latent variables $z_a$, $z_d$, and $z_r$, one for each aspect of the task that is known to vary in the training environments. FIG. 3 illustrates a model based on a Markov decision process with structured latent variables for dynamics ($z_d$), agent variation ($z_a$) and reward functions ($z_r$), according to one embodiment. Accordingly, the prior knowledge about the structure of the tasks is encoded into the structure of the model. This model is referred to as the structured latent variable (structured LV) model. The latent variables may be either shared or distinct.

In one embodiment, the model captures the dynamics and reward hidden parameters jointly with a single latent variable $z \in \mathcal{R}^D$. A latent variable is aimed at learning a representation of the hidden parameters which can either be decoded to the actual parameters or fed into a surrogate dynamics model directly. In this case, z is used for all functions in the GH-MDP. The model for episode return $R = \Sigma r_{t+1}$ for a trajectory decomposed into partial rewards $r_{t+1}$ is determined using following equation in which T is the episode length.

$$p\left(R \mid s_{0:T}, a_{0:T-1}, z\right) = \prod_{t=0}^{T-1} p_\omega(r_{t+1} \mid s_t, a_t, s_{t+1}, z) \qquad (5)$$

The resulting joint model over trajectories $p(s_{0:T}, a_{0:T-1}, R, z)$ is represented using the following equation (6).

$$p(z)p(s_0) \prod_{t=0}^{T-1} [p(r_{t+1} \mid s_t, a_t, s_{t+1}, z)p(s_{t+1} \mid s_t, a_t, z)p(a_t \mid s_t, z)] \qquad (5)$$

In this model, a global latent variable z conditions both the dynamics and the reward distributions. The priors for auxiliary latent variable are set to simple normal distributions, $p(z) = \mathcal{N}(0, I)$, and initial state distribution $p(s_0)$ to the environment simulator.

Structured Latent Variable Model

In some embodiments, the machine learning model uses multiple plated variables which constitute the structured latent space of the GHP-MDP. Separate latent spaces for dynamics and reward allow agents to pursue different goals across environments with different dynamics. The joint model $p(s_{0:T+1}, a_{0:T}, R, z_d, z_r)$, including the action distribution implied by control, is described using equation (6).

$$p(z_d)p(z_r)p(s_0)$$
$$\prod_{t=0}^{T-1} [p(r_{t+1} \mid s_t, a_t, s_{t+1}, z_r)p(s_{t+1} \mid s_t, a_t, z_d)p(a_t \mid s_t, z_r, z_d)] \qquad (6)$$

In equation 6, the term $p(z_d)$ represents the distribution of the latent variable $z_d$, the term $p(z_r)$ represents the distribution of the latent variable $z_r$, and the term $p(s_0)$ represents the distribution of the state $s_0$, the term $[p(r_{t+1}|s_t, a_t, s_{t+1}, z_r)$ represents the distribution of the reward $r_{t+1}$, the term $p(s_{t+1}|s_t, a_t, z_d)$ represents the distribution of the state $s_{t+1}$, and the term $p(a_t|s_t, z_r, z_d)$ represents the distribution of actions $a_t$. This structure of the model facilitates solving tasks where both of these aspects (dynamics and reward) can vary independently.

In general, the model may have c arbitrary plated contexts, such as agent, dynamics, reward variation, etc. Accordingly, the model uses a set of latent variables $\{z_1, \ldots, z_c\}$, each latent variable representing a different factor of variation in the system, implying $p(z) = \Pi p(z_c)$. This allows the model to have separate degrees of freedom in latent space for distinct effects. The use of plated variables implies that tasks will have known factors of variation (but unknown values and effects) at training time only. In practice, this is the case when training on a simulator.

By factorizing the latent space to mirror the causal structure of the task, the structured LV model can also more efficiently express the full combinatorial space of variations. For example, with c=3 factors of variation and 10 variations for each $i \in \{1, 2, 3\}$, the latent space must generalize to $10 \times 10 \times 10 = 10^3$ combinations. Learning a global latent space would require data from some non-trivial fraction of this total. In contrast, a structured space can generalize from $10 + 10 + 10 = 30$.

Process

Figure 4:
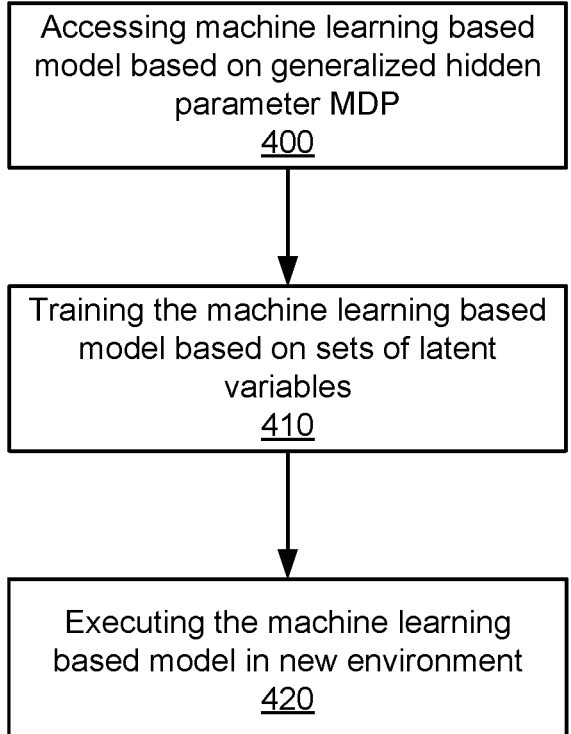
FIG. 4 illustrates a flowchart illustrating a process for training and using deep reinforcement learning based models, according to one embodiment.

FIG. 4 illustrates a flowchart illustrating a process for training and using deep reinforcement learning based models, according to one embodiment.

The system accesses 400 a machine learning model for reinforcement learning using generalized hidden parameter Markov decision processes (GHP-MDP). The GHP-MDP is represented using a state space, an action space, a transition function, and a reward function. The transition function and the reward function are parameterized by a set of latent variables, wherein the machine learning model is configured for execution by an agent in an environment, wherein each hidden parameter corresponds to one or more of: (a) a factor representing an environment in which the machine learning model is executed, or (b) an attribute of an agent executing the machine learning based model.

The system trains 410 the machine learning model based on variations of the set of latent variables. The system executes 420 the machine learning model in a new environment. The execution of the machine learning model is based on values of latent variables from the set of latent that is distinct from values of latent variables used during training of the machine learning based model.

In an embodiment, the system uses a set of latent variables corresponding to the transition function and a set of latent variables corresponding to the reward function. The execution of the machine learning model is based on a combination of latent variables from the sets of latent variables corresponding to the transition function and the reward function that is distinct from combinations of latent variables used during training of the machine learning based model.

Each step/episode of training includes two phases: collect an episode of trajectories $\mathcal{D}_k$ for each task via planning (Algorithm 1), and infer model parameters and latent variables using all collected data via SGD (stochastic gradient descent). The goal of the inference (learning) step is to maximize the marginal likelihood of observed transitions with respect to $\theta$ and $\varphi$. For the joint latent variable model, the intractable distribution $p(z|\mathcal{D})$ is approximated with $q_\varphi(z)$ parameterized by a diagonal Gaussian. The system maximizes the evidence lower bound (ELBO) to a marginal log-likelihood.

The system may choose the prior $p(z)$ and variational distribution $q_\varphi(z)$ to be Gaussian with diagonal covariance.

The system may use this criterion during the training phase to jointly update network parameters and variational parameters capturing beliefs about latent variables. In some embodiments, the system uses stochastic variational inference and sub samples in order to perform inference and learning via gradient descent, yielding a log loss function.

Both models are ensembles and each network in the ensemble is optimized independently, but the variational distribution is shared according the relationship between tasks. During training, the system minimizes a log loss metric and at execution time, reset $q_\varphi$ to the prior and minimize with respect to $\varphi$ only.

In some embodiments, the system uses learned dynamics model to allow agents to plan into the future by recursively predicting future states $s_{t+1}, \ldots, s_{t+h}$ induced by proposed action sequences $a_t, a_{t+1}, \ldots, a_{t+h}$. If actions are conditioned on the previous state to describe a policy, then planning becomes learning a policy $\pi^*$ to maximize expected reward over the predicted state-action sequence. In this approach, modeling errors are compounded at each time step, resulting in sub-optimal policies when the learning procedure overfits to the imperfect dynamics model. Other embodiments use model predictive control (MPC) to find the action trajectory $a_{t:t+H}$ that optimizes certain criteria at run-time, for example, $\sum_t^{t+H-1} \mathbb{E}_{q_\phi(z)} \mathbb{E}_{p(s_t, a_t)}[p(r_{t+1}|s_t, a_t, s_{t+1}, z)]$, using $s_{t+1}$ predicted from the learned model. At each time step, the MPC controller plans into the future, finding a good trajectory over the planning horizon H but applying only the first action from the plan, and re-plans again at the next step. Because of this, MPC is better able to tolerate model bias and unexpected perturbations.

Embodiments use a control procedure that uses the cross-entropy method (CEM) as the optimizer for an MPC controller. On each iteration, CEM samples 512 proposed action sequences $a_{t:t+H-1}$ from H independent multivariate normal distributions, one for each time step in the planning horizon, and calculates the expected reward for each sequence. The top 10% performing of these are used to update the proposal distribution mean and covariance. However, evaluating the expected reward exactly is intractable. Therefore, the system uses a particle based approach based on trajectory sampling (TS) to propagate the approximate next state distributions. The TS+CEM process is adapted to incorporate beliefs about the MDP given data observed so far. Each state particle $s_t^{(p)}$ uses a sample of each latent variable $z^{(p)}$ so that planning can account for their effect on the dynamics and reward models. At execution time, the system does not perform learning and keeps the models (e.g., neural networks) fixed. The process iterates between acting in the environment at step t and inferring $p(z|\mathcal{D}\,D_t)$ in order to align the dynamics and reward models with the current system as new information is collected. In order to plan when episodes can terminate early due to constraints set by the environment, the system sets cumulative rewards for particle trajectories that violate those constraints to a fixed constant. This hyperparameter is set to 0 during training to allow exploration, and −100 at execution time for more conservative planning.

The system can work in following modes: (1) Transfer that occurs when learning across tasks is faster than learning each task individually. (2) Weak generalization that requires performing well on a task that was not seen during training but has closely related dynamics and/or reward. Meta-RL commonly assumes tasks at meta-test time are drawn from the same distribution as meta-training, and so falls under this umbrella. (3) Strong generalization that requires performing well on a task with dynamics and/or reward that is outside what was seen during training. This setting falls under transfer learning or online adaptation, in which an agent leverages previous training to learn more quickly on a new out-of-distribution task/environment.

Systems according to embodiments disclosed may be used for any application utilizing MDP based reinforcement learning, for example, for controlling robots, controlling self-driving vehicles, setting pricing for a business, and other tasks.

Computing System Architecture

Figure 5:
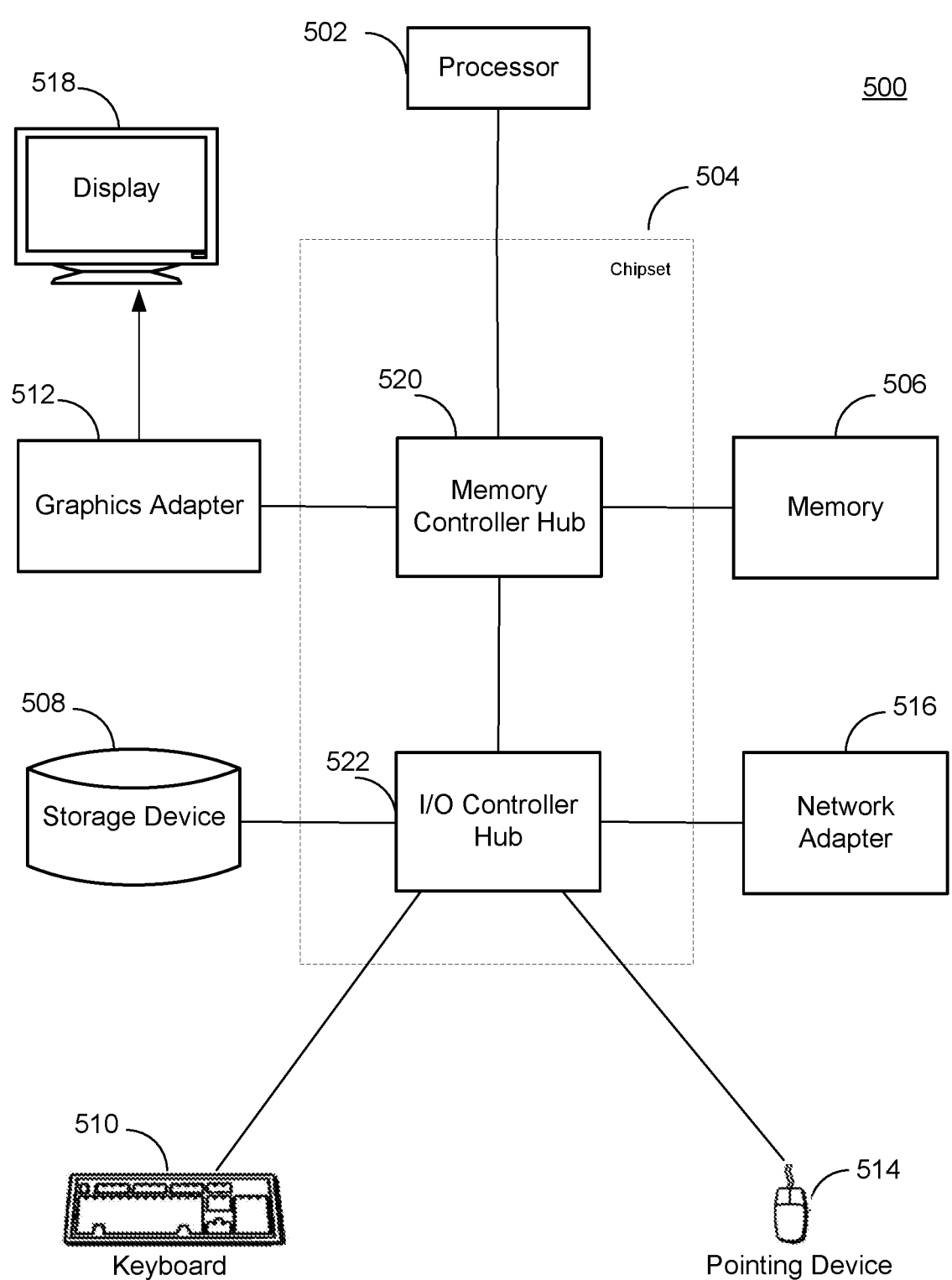
FIG. 5 is a high-level block diagram illustrating an example of a computer suitable for use in the system environment of FIG. 1-2, according to one embodiment.

FIG. 5 is a high-level block diagram illustrating an example computer 500 suitable for use as a client device 140, application hosting server 120, or application provider system 110. The example computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, touch-screen, or other type of pointing device, and is used in combination with the keyboard 510 (which may be an on-screen keyboard) to input data into the computer system 500. The graphics adapter 512 displays images and other information on the display 518. The network adapter 516 couples the computer system 500 to one or more computer networks (e.g., network 170).

The types of computers used by the entities of FIG. 1 can vary depending upon the embodiment and the processing power required by the entity. For example, the application hosting server 120 might include a distributed database system comprising multiple blade servers working together to provide the functionality described. Furthermore, the computers can lack some of the components described above, such as keyboards 510, graphics adapters 512, and displays 518.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for compressing neural networks. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

We claim:

1. A computer implemented method comprising:

accessing, by a system, a machine learning model for reinforcement learning using Markov decision processes (MDP), the MDP represented using a state space, an action space, a transition function corresponding to a first environment, and a reward function corresponding to a first type of task, wherein the transition function is parameterized by first variations of a first set of latent variables and the reward function is parameterized by first variations of a second set of latent variables, wherein the machine learning model is configured for execution by an agent in an environment, wherein the first set of latent variables or the second set of latent variables comprise (a) a first latent variable corresponding to a hidden parameter representing an attribute of the agent and (b) a second latent variable corresponding to a hidden parameter representing a change in the reward function, wherein the transition function indicates a probability of transitioning from a current state to a new state responsive to an action taken by the agent in the first environment, and the reward function indicates a reward that the agent receives after taking the action and transitioning to the new state in the first environment;

training the machine learning model comprising:

training based on first variations of the first set of latent variables, and training based on the first variations of the second set of latent variables; and executing the machine learning model to perform a new type of task by the agent in a second environment, executing the machine learning model comprising:

determining a set of sequences of proposed actions;

for each sequence of proposed actions in the set, determining a sequence of future states responsive to performing the sequence of proposed actions based on the transition function; and determining an expected reward for the sequence of future states based on the reward function; and selecting a subset of the sequences of proposed actions based on their expected rewards;

determining a distribution of states or rewards in the second environment; and inferring second variations of the first set of the latent variables or the second set of latent variables in the second environment based on the distribution of states or rewards, the inferred second variations of the first set of latent variables or the second set of latent variables aligning the transition function or the reward function with the second environment.

2. The computer implemented method of claim 1, further comprising:

initializing a dataset representing transitions; and repeatedly:

training the machine learning model using the dataset; and augmenting the dataset using new transitions.

3. The computer implemented method of claim 1, wherein the agent represents a robot and the environment represents an obstacle course in which the robot is moving.

4. The computer implemented method of claim 3, wherein the robot comprises sensors for capturing data describing environment of the robot, and wherein the machine learning model receives as input, sensor data captured by the sensors of the robot and predicts information describing one or more objects in the environment of the robot.

5. The computer implemented method of claim 1, wherein the agent represents a self-driving vehicle and the environment represents traffic through which the self-driving vehicle is moving.

6. The computer implemented method of claim 5, wherein the self-driving vehicle has one or more sensors mounted on the self-driving vehicle, and wherein the machine learning model receives as input, sensor data captured by the sensors of the self-driving vehicle and predicts information describing one or more entities in the environment through which the self-driving vehicle is driving.

7. The computer implemented method of claim 1, wherein the agent represents a pricing engine for setting pricing for a business and the environment represents the business.

8. A non-transitory computer readable storage medium storing instructions, the instructions when executed by a processor, cause the processor to perform steps comprising:

accessing, by a system, a machine learning model for reinforcement learning using Markov decision processes (MDP), the MDP represented using a state space, an action space, a transition function corresponding to a first environment, and a reward function corresponding to a first type of task, wherein the transition function is parameterized by first variations of a first set of latent variables and the reward function is parameterized by first variations of a second set of latent variables, wherein the machine learning model is configured for execution by an agent in an environment, wherein the first set of latent variables or the second set of latent variables comprise (a) a first latent variable corresponding to a hidden parameter representing an attribute of the agent and (b) a second latent variable corresponding to a hidden parameter representing a change in the reward function, wherein the transition function indicates a probability of transitioning from a current state to a new state responsive to an action taken by the agent in the first environment, and the reward function indicates a reward that the agent receives after taking the action and transitioning to the new state in the first environment;

training the machine learning model comprising:

training based on first variations of the first set of latent variables, and training based on the first variations of the second set of latent variables; and executing the machine learning model to perform a new type of task by the agent in a second environment, executing the machine learning model comprising:

determining a set of sequences of proposed actions;

for each sequence of proposed actions in the set, determining a sequence of future states responsive to performing the sequence of proposed actions based on the transition function; and determining an expected reward for the sequence of future states based on the reward function; and selecting a subset of the sequences of proposed actions based on their expected rewards;

determining a distribution of states or rewards in the second environment; and inferring second variations of the first set of the latent variables or the second set of latent variables in the second environment based on the distribution of states or rewards, the inferred second variations of the first set of latent variables or the second set of latent variables aligning the transition function or the reward function with the second environment.

9. The non-transitory computer readable storage medium of claim 8, further comprising:

initializing a dataset representing transitions; and repeatedly:

training the machine learning model using the dataset; and augmenting the dataset using new transitions.

10. The non-transitory computer readable storage medium of claim 8, wherein the agent represents a robot and the environment represents an obstacle course in which the robot is moving.

11. The non-transitory computer readable storage medium of claim 10, wherein the robot comprises sensors for capturing data describing environment of the robot, and wherein the machine learning model receives as input, sensor data captured by the sensors of the robot and predicts information describing one or more objects in the environment of the robot.

12. The non-transitory computer readable storage medium of claim 8, wherein the agent represents a self-driving vehicle and the environment represents traffic through which the self-driving vehicle is moving.

13. The non-transitory computer readable storage medium of claim 12, wherein the self-driving vehicle has one or more sensors mounted on the self-driving vehicle, and wherein the machine learning model receives as input, sensor data captured by the one or more sensors of the self-driving vehicle and predicts information describing one or more entities in the environment through which the self-driving vehicle is driving.

14. A computer system comprising:

a processor; and a non-transitory computer readable storage medium storing instructions, the instructions when executed by a processor, cause the processor to perform steps comprising:

accessing, by a system, a machine learning model for reinforcement learning using Markov decision processes (MDP), the MDP represented using a state space, an action space, a transition function corresponding to a first environment, and a reward function corresponding to a first type of task, wherein the transition function is parameterized by first variations of a first set of latent variables and the first reward function is parameterized by first variations of a second set of latent variables, wherein the machine learning model is configured for execution by an agent in an environment, wherein the first set of latent variables or the second set of latent variables comprise (a) a first latent variable corresponding to a hidden parameter representing an attribute of the agent and (b) a second latent variable corresponding to a hidden parameter representing a change in the reward function, wherein the transition function indicates a probability of transitioning from a current state to a new state responsive to an action taken by the agent in the first environment, and the reward function indicates a reward that the agent receives after taking the action and transitioning to the new state in the first environment;

training the machine learning model comprising:

training based on first variations of the first set of latent variables, and training based on the first variations of the second set of latent variables; and executing the machine learning model to perform a new type of task by the agent in a second environment, executing the machine learning model comprising:

determining a set of sequences of proposed actions;

for each sequence of proposed actions in the set, determining a sequence of future states responsive to performing the sequence of proposed actions based on the transition function; and determining an expected reward for the sequence of future states based on the reward function; and selecting a subset of the sequences of proposed actions based on their expected rewards;

determining a distribution of states or rewards in the second environment; and inferring second variations of the first set of the latent variables or the second set of latent variables in the second environment based on the distribution of states or rewards, the inferred second variations of the first set of latent variables or the second set of latent variables aligning the transition function or the reward function with the second environment.

15. The computer system of claim 14, further comprising:

initializing a dataset representing transitions; and repeatedly:

training the machine learning model using the dataset; and augmenting the dataset using new transitions.

16. The computer system of claim 14, wherein the agent represents a robot and the environment represents an obstacle course in which the robot is moving.

17. The computer system of claim 16, wherein the robot comprises sensors for capturing data describing environment of the robot, and wherein the machine learning model receives as input, sensor data captured by the sensors of the robot and predicts information describing one or more objects in the environment of the robot.

18. The computer system of claim 14, wherein the agent represents a self-driving vehicle and the environment represents traffic through which the self-driving vehicle is moving.

19. The computer system of claim 18, wherein the self-driving vehicle has one or more sensors mounted on the self-driving vehicle, and wherein the machine learning model receives as input, sensor data captured by the one or more sensors of the self-driving vehicle and predicts information describing one or more entities in the environment through which the self-driving vehicle is driving.

\* \* \* \* \*